(12) United States Patent
Dommaraju (10) Patent No.: US 10,509,615 B2
(45) Date of Patent: Dec. 17, 2019

(54) METHOD AND SYSTEM FOR MANAGING ACCESS OF FUNCTIONS IN A MULTI-FUNCTIONAL PRINTER

(71) Applicant: TOSHIBA TEC KABUSHIKI KAISHA, Shinagawa-ku, Tokyo (JP)

(72) Inventor: Harinadh Dommaraju, Karnataka (IN)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 15/988,362

(22) Filed: May 24, 2018

(65) Prior Publication Data

US 2019/0187948 A1   Jun. 20, 2019

(30) Foreign Application Priority Data

Dec. 15, 2017   (IN) .............................. 201741045249

(51) Int. Cl.
| | | |
|---|---|---|
| *G06F 11/07* | (2006.01) | |
| *H04N 1/00* | (2006.01) | |
| *G06F 3/14* | (2006.01) | |

(52) U.S. Cl.
CPC ........ *G06F 3/1446* (2013.01); *G06F 11/0766* (2013.01); *H04N 1/00029* (2013.01); *H04N 1/00037* (2013.01); *H04N 1/00074* (2013.01); *H04N 1/00413* (2013.01)

(58) Field of Classification Search
CPC .............. G06F 3/1446; H04N 1/00029; H04N 1/00037; H04N 1/00074; H04N 1/00413
See application file for complete search history.

(56) References Cited

U.S. PATENT DOCUMENTS

| | | |
|---|---|---|
| 5,801,814 A | 9/1998 | Matsumoto |
| 6,041,200 A | 3/2000 | Glass et al. |
| 6,185,379 B1 * | 2/2001 | Lay .......................... B41J 29/46 399/11 |
| 2002/0171681 A1 | 11/2002 | Nomura et al. |
| 2012/0268771 A1 * | 10/2012 | Kruizinga .......... H04N 1/00029 358/1.14 |
| 2016/0318312 A1 * | 11/2016 | Hedberg .................... B41J 3/46 |

* cited by examiner

*Primary Examiner* — Stephen G Sherman
(74) *Attorney, Agent, or Firm* — Foley & Lardner LLP (57) ABSTRACT

A method and device are provided for managing access of functions in a Multi-Functional Printer (MFP) by an access manager. The access manager receives information regarding occurrence of at least one error in at least one functional unit of the MFP, and identifies one or more functions operably dependent on at least one functional unit one or more functions operably independent of at least one functional unit, based on a pre-defined master error list. The, access manager divides a display screen of MFP into a plurality of display portions, where a first display portion of a plurality of display portions displays one or more functions operably independent of at least the one functional unit and a second display portion of the plurality of display portions displays information associated with at least one error that has occurred in at least one functional unit of the MFP.

16 Claims, 10 Drawing Sheets

METHOD AND SYSTEM FOR MANAGING ACCESS OF FUNCTIONS IN A MULTI-FUNCTIONAL PRINTER

CROSS REFERENCE TO RELATED APPLICATIONS

This application is based upon and claims the benefit of priority from Indian Patent Application No. 201741045249, filed on Dec. 15, 2017, the entire contents of which are incorporated herein by reference.

TECHNICAL FIELD

The present subject matter is related in general to multi-functional printers (MFPs), more particularly, but not exclusively, to a method and system for managing access of functions in an MFP.

BACKGROUND

MFPs have taken territory in today's home and business offices due to their quality, versatility, reliability, ease of use, small size, and the improvements they bring to productivity. As the name implies, the MFP can perform multiple functions such as advanced printing, faxing, scanning, photocopying and the like. Owing to the performance and advantages of MFPs, the numbers and utilization of MFPs have grown tremendously in recent years.

However, in existing MFPs, occurrence of an error such as a paper jam, scan error etc., leads to rejection of execution of all other functions. That is, if an error occurs in the printing function of an MFP, the other functions such as scanning, copying etc., may also become unusable and inaccessible, even if the one or more other functions have no operational problem. This impedes the efficient use of the multi-functional printers.

The information disclosed in this background of the disclosure section is only for enhancement of understanding of the general background and should not be taken as an acknowledgement or any form of suggestion that this information forms the prior art already known to a person skilled in the art.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method for managing access of functions in an MFP. The present disclosure provides an access manager which manages access of the functions in the MFP. In at least one embodiment, the MFP refers to an all in one peripheral device which incorporates functionality of multiple devices. During any error occurrence, the access manager receives information regarding at least one error that has occurred in at least one functional unit of the MFP. Functions operably dependent on at least the one functional unit and functions operably independent of at least the one functional unit are identified using a master error list. Further, a display screen of the MFP may be divided into a plurality of display portions. A first display portion of the plurality of display portions may display the functions, which may be operably independent of at least the one functional unit. Also, a second display portion from the plurality of display portions may display information associated with the error that has occurred in at least the one functional unit. The present disclosure provides an efficient MFP which facilitates access to functions not associated with any errors in the MFP.

In at least one embodiment, the present disclosure relates to a method for managing access of functions in a Multi-Functional Printer. The method comprises receiving, information regarding occurrence of at least one error, in at least one functional unit of the MFP, identifying one or more functions operably dependent on the least one functional unit and one or more functions operably independent of at least the one functional unit, based on a pre-defined master error list and dividing a display screen of the MFP into a plurality of display portions. A first display portion of the plurality of display portions displays the one or more functions operably independent of at least the one functional unit and a second display portion of the plurality of display portions displays information associated with the at least one error that has occurred in the at least one functional unit of the MFP.

In at least one embodiment, the present disclosure relates to an access manager for managing access of functions in a Multi-Functional Printer. The access manager comprises a processor and a memory communicatively coupled to the processor, wherein the memory stores processor executable instructions, which, on execution, may cause the access manager to receive information regarding occurrence of at least one error, in at least one functional unit of the MFP, identify one or more functions operably dependent on the at least one functional unit and one or more functions operably independent of at least the one functional unit, based on a pre-defined master error list and divide a display screen display screen of the MFP into a plurality of display portions. A first display portion of the plurality of display portions displays the one or more functions operably independent of at least the one functional unit and a second display portion of the plurality of display portions displays information associated with the at least one error that has occurred in the at least one functional unit of the MFP.

Figure 1:
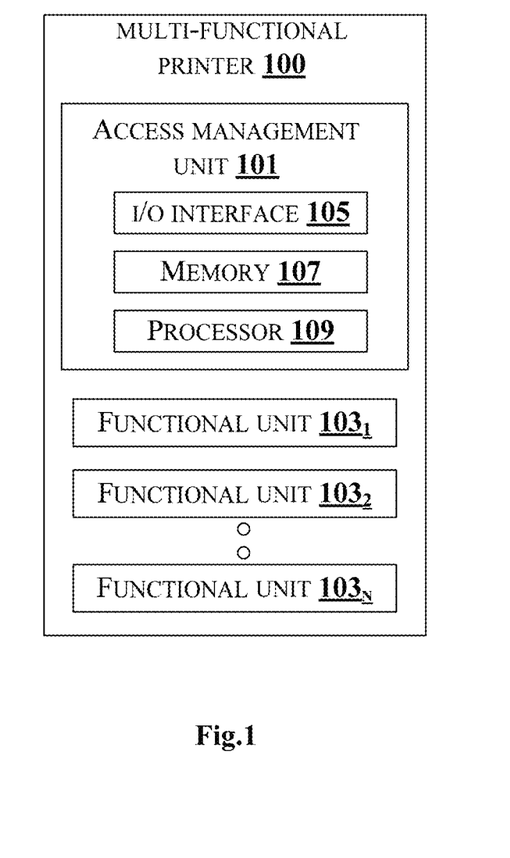
FIG. 1 illustrates an exemplary embodiment of a Multi-Functional Printer (MFP) for managing access of functions in the MFP in some embodiments of the present disclosure.

FIG. 1 illustrates a Multi-Functional Printer (MFP) for managing access of functions in the MFP according to at least one embodiment of the present disclosure.

As shown in FIG. 1, a Multi-Functional Printer (MFP) 100 includes an access manager 101, a functional unit $103_1$, a functional unit $103_2$, ..., and a functional unit $103_N$. In at least one embodiment, the functional unit $103_1$, the functional unit $103_2$, ..., and the functional unit $103_N$ are collectively referred as one or more functional unit 103. In at least one embodiment, the one or more functional units 103 may include a scanner, a printer, a fax unit (a facsimile machine), a copier, and the like. The functional units are functional components that are physical components of the MFP 100, each of which is an MFP component dedicated to carrying out specified operations (e.g., the fax unit is a fax module that carries out sending and receiving of facsimile transmissions). A person skilled in the art would understand that the one or more functional unit 103 may include other units not mentioned explicitly in the present disclosure. The access manager 101 comprises an I/O interface 105, a memory 107 and a processing 109. The access manager 101 manages functions of the MFP 100. In at least one embodiment, the access manager 101 may be integrated with the MFP 100 or may be a standalone unit associated with the MFP 100.

Initially, the access manager 101 may receive information regarding occurrence of at least one error, in one or more functional unit 103 of the MFP 100, whenever any error occurs. In at least one embodiment, at least one error may be associated with functions of the one or more functional unit 103 and may include, but is not limited to, a print error, a scan error, a speech mismatch error, a copy error, an electronic filing error, a fax error, a disk check error, a system error, an engine error, a service call error and the like, based on the one or more functional unit 103. A person skilled in the art would understand that the error may include any other errors in the MFP 100, based on the type of the functional unit of the MFP 100. In at least one embodiment, each error may be associated with one or more functions of the one or more functional unit 103. The access manager 101 identifies one or more functions which may be operably dependent on the one or more functional unit 103 and one or more functions which may be operably independent of the one or more functional unit 103, based on a predefined master error list. In at least one embodiment, the predefined master error list may include all errors associated with the one or more functional unit 103 of the MFP 100 along with associated error number, priority and the one or more functions. Further, the access manager 101 may update a current error list with the received at least one error along with associated error number, priority and one or more functions. The access manager 101 may divide a display screen of the MFP 100 in to a plurality of display portions. In at least one embodiment, a first display portion of the plurality of display portions may display the one or more functions operably independent of the one or more functional unit 103. In at least one embodiment, a second display portion of the plurality of display portions may display information associated with at least the one error that has occurred in the one or more functional unit 103 of the MFP 100. In at least one embodiment, the access manager 101 may at least one of interrupt or disable access to a user of the MFP 100 to the one or more functions which are operably dependent on the one or more functional unit 103. Subsequently, the access manager 101 may enable access to the user to the one or more functions which may be operably independent of the one or more functional unit 103. In at least one embodiment, access manager 101 may display the one or more functions which are operably dependent on the one or more functional unit 103 along with an error number in the first display portion. In at least one embodiment, the access manager 101 may remove at least the one error from the current error list and may enable access to the one or more functions associated with the at least one removed error, upon recovery of the at least one error.

The access manager 101 comprises an I/O interface 105, a memory 107 and a processor 109. The I/O interface 105 is configured to receive information regarding at least one error in the one or more functional unit 103 of the MFP 100.

The received information from the I/O interface 105 is stored in the memory 107. The memory 107 is communicatively coupled to the processor 109 of the access manager 101.

Figure 2:
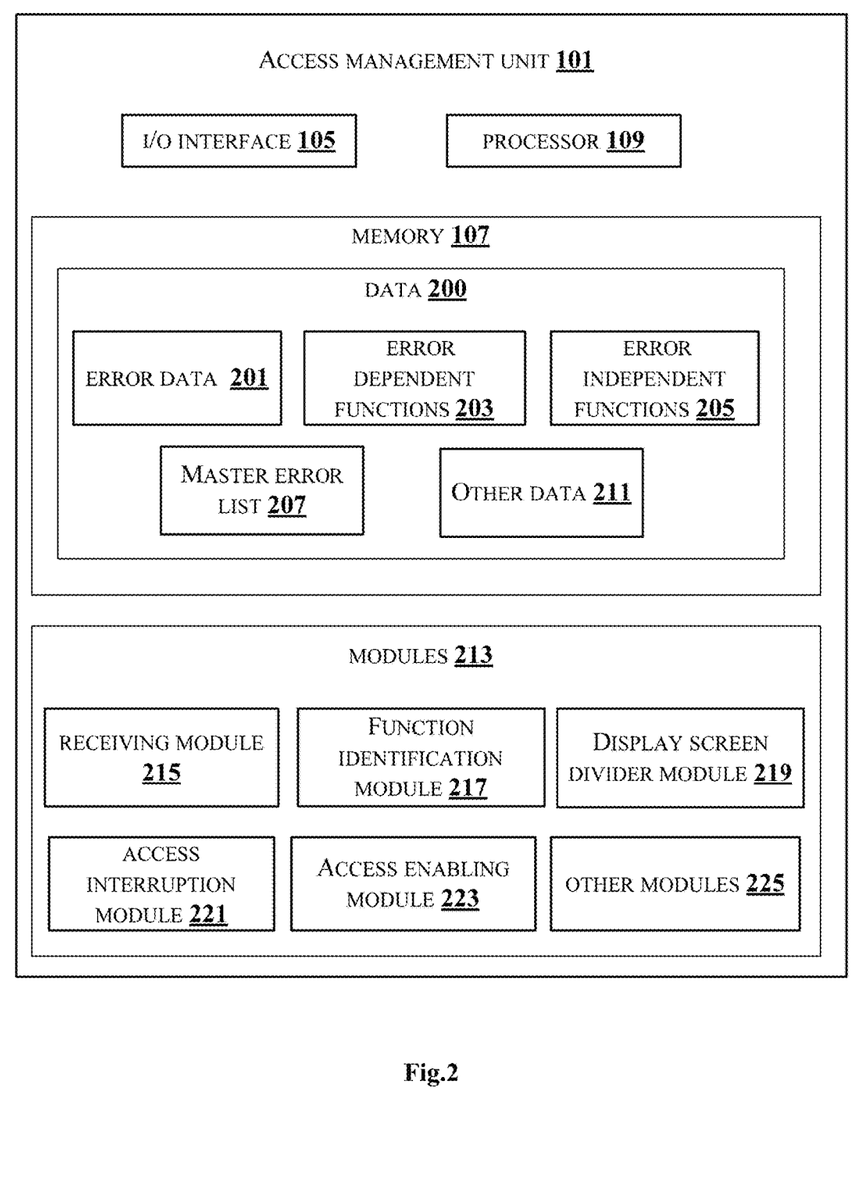
FIG. 2 shows a detailed block diagram of an access manager in accordance with some embodiments of the present disclosure.

FIG. 2 shows a detailed block diagram of an access manager in accordance with some embodiments of the present disclosure.

Data 200 and one or more modules 213 of the access manager 101 are described herein in detail. In at least one embodiment, the data 200 includes error data 201, error dependent functions 203, error independent functions 205, a master error list 207 and other data 211.

The error data 201 may include details associated with at least the one error that has occurred in the one or more functional unit 103 of the MFP 100. The details may include type of error, error number, one or more functions associated with the error, priority of the error and the like. The error data 201 may include the current error list. In at least one embodiment, after a function recovers, the error data 201 may be updated by removing the details of the recovered function from current error data 201 and the error related functional unit may be enabled. In at least one embodiment, the error data 201 may also contain status data associated with the one or more functional unit 103. In at least one embodiment, the error type may include, for example, a print error, scan error, speech mismatch error, copy error, electronic filing error, fax error, disk check error, system error, engine error, service call error and the like. An exemplary current error list is displayed in below Table 1.

TABLE 1

| Error number | Related Function | Priority |
|---|---|---|
| E430 | COPY PRINT SIMPLE COPY | 0 |
| F106 | E-FILING1 | 16 |
| J834 | SCAN | 20 |
| C382 | FAX | 33 |

The error dependent functions 203 may include the one or more functions which may be operably dependent of the one or more functional unit 103 of the MFP 100. For example, consider an error that occurs in a printer unit (a printer), which may be one of the functional units of the MFP 100. In such case, the one or more functions which may operably depend on the printer unit may include a copying function, a printing function, an e-filing function and the like.

The error independent functions 205 may include the one or more functions which may be operably independent of the one or more functional unit 103 of the MFP 100. For example, consider, an error occurs in the printer unit of the MFP 100. In such case, the one or more functions which may be independent of the printer unit may include fax and scanning functions.

The master error list 207 may include a predefined list of all error associated with the MFP 100 along with associated error number, priority and one or more functions. An exemplary master error list is displayed in Table 2 below.

TABLE 2

| Error number | Related Function | Priority |
|---|---|---|
| E430 | COPY PRINT SIMPLE COPY | 12 |
| XXXX | XXXX | XX |
| F106 | E-FILING1 | 16 |
| XXXX | XXXX | XX |
| J834 | SCAN | 20 |
| XXXX | XXXX | XX |
| C382 | FAX | 33 |

The other data 211 may include data, including temporary data and temporary files, generated by modules 213 for performing the various functions of the access manager 101.

In at least one embodiment, the data 200 in the memory 107 are processed by the one or more modules 213 of the access manager 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality.

In one implementation, the one or more modules 213 may include, but are not limited to, a receiving module (a receiver) 215, a function identification module (a function identifier) 217, a display screen divider module (a divider) 219, an access interruption module (an interrupter) 221 and an access enabling module (an access enabler or access device) 223. The one or more modules 213 may also comprise other modules 225 to perform various miscellaneous functionalities of the access manager 101. The other modules 225 may include an error detection module (a detector), a dual display module (a dual display system) and an error removal module (an error remover). The error detection module may be used to detect occurrence of one or more errors in the one or more functional unit 103 of the MFP 100. The dual display module may be a removable display in the MFP 100 and the error removable module may be used for removing at least the one error from the current error list, upon recovery from at least the one error. It will be appreciated that such modules 213.may be represented as a single module or a combination of different modules 213.

The receiving module 215 may receive information associated with at least the one error that has occurred in the one or more functional unit 103 of the MFP 100. The information associated with at least the one error is updated in the current error list.

The function identification module 217 may identify the one or more functions which may be operably dependent on the one or more functional unit 103 of the MFP 100 and the one or more functions which may be operably independent of the one or more functional unit 103 of the MFP 100. The function identification module 217 may identify the one or more functions based on the master error list 207. The function identification module may map the at least one error in the one or more functional unit 103 with error information in the master error list 207 to identify the one or more functions operably dependent and one or more functions which may be operably independent of the one or more functional unit 103. For example, consider an error which occurs in the printer unit, such as a "paper jam error". In such case, the one or more functions which may be operably dependent on the printer unit may be an electronic print function, and functions which may be operably independent of the printer unit may be a scanning function, and a fax to print function, etc.

Figure 3A:
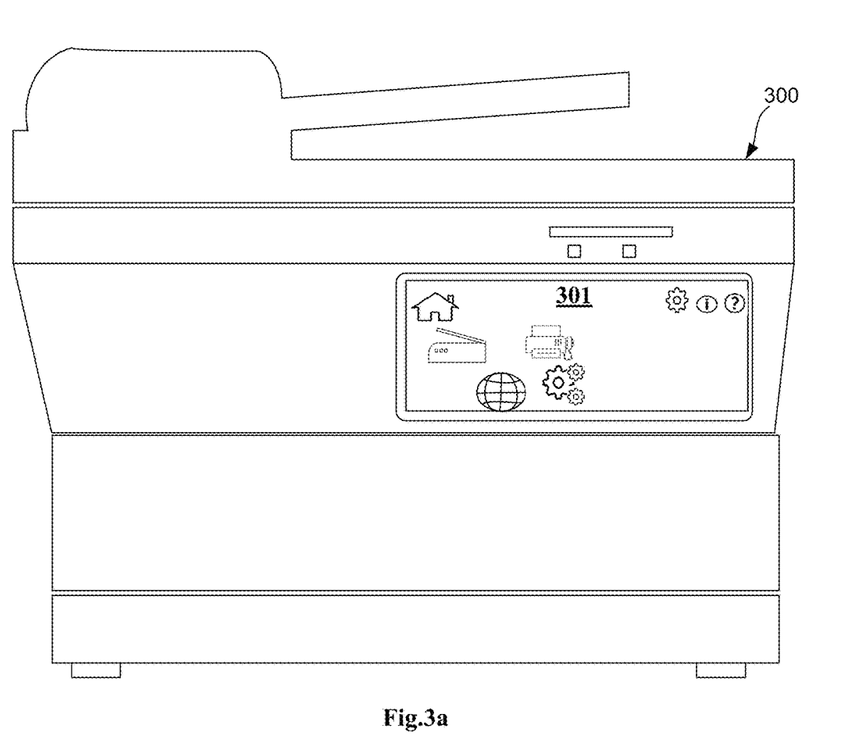
FIG. 3a shows an exemplary side view representation of a Multi-Functional Printer with a first display portion in accordance with some embodiments of the present disclosure.

The display screen divider module 219 may divide the display screen of the MFP 100 into the plurality of display portions. In at least one embodiment, the first display portion of the plurality of display portions may display the one or more functions which may be operably independent of the one or more functional unit 103. Further, the second display portion of the plurality of display portions may display information associated with at least one error that has occurred in the one or more functional unit 103 of the MFP 100. In at least one embodiment, the plurality of display potions may be flipped, swiped up, down, left, and right. In at least one embodiment, the display portion displaying the error information may be minimized and maximized. In at least one embodiment, the one or more functions which may be operably dependent on the one or more functional unit 103 along with error number may be displayed in the first display portion. FIG. 3a shows an exemplary side view representation of a Multi-Functional Printer with a first display portion in accordance with some embodiments of the present disclosure. FIG. 3a comprises a side view of the MFP 300. A display screen 301 representing the first display portion of the MFP 300 is shown. The display screen 301 displays one or more function icons such as a scan icon, a fax icon etc. The scan icon and fax icon are displayed after an error occurrence in the printer unit of the MFP 100. The one or more function icons displayed in the display screen 301 represent the functions which are operably independent of the printer unit, in which the error has occurred.

Figure 3B:
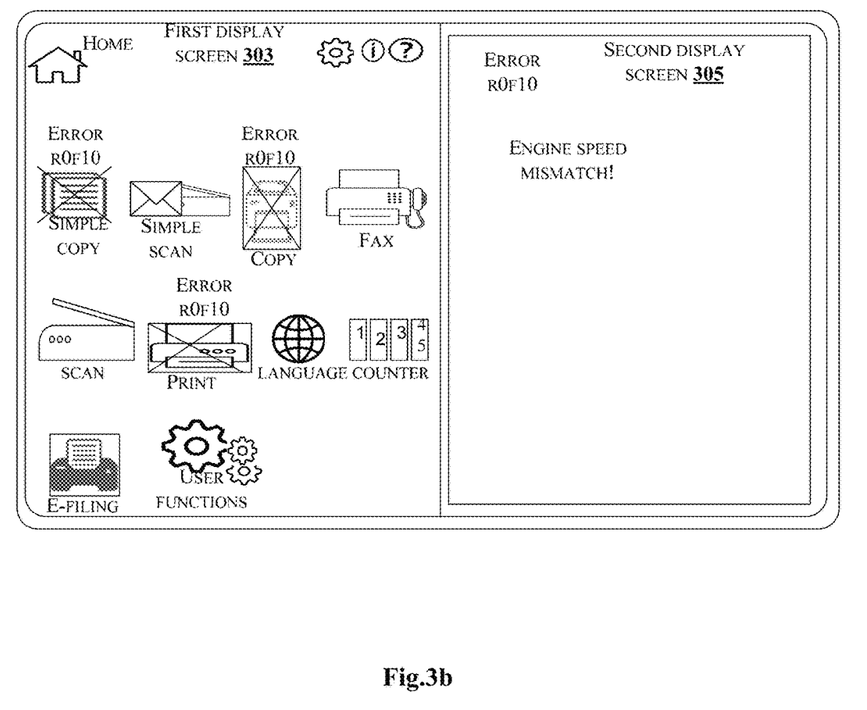
FIG. 3b shows an exemplary representation of a display screen with two display portions in accordance with some embodiments of the present disclosure.
Figure 3C:
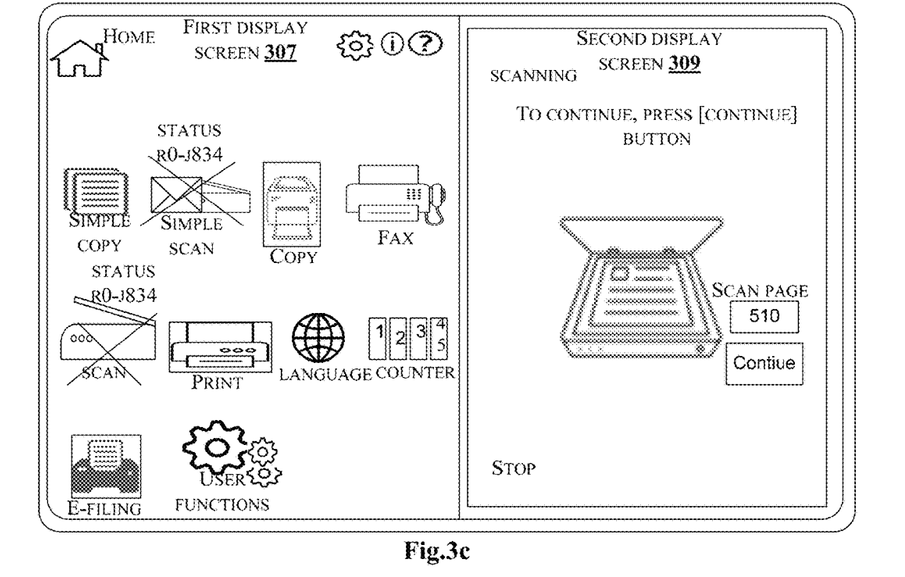
FIG. 3c shows an exemplary representation of a display screen with two display portions in accordance with some embodiments of the present disclosure.
Figure 3D:
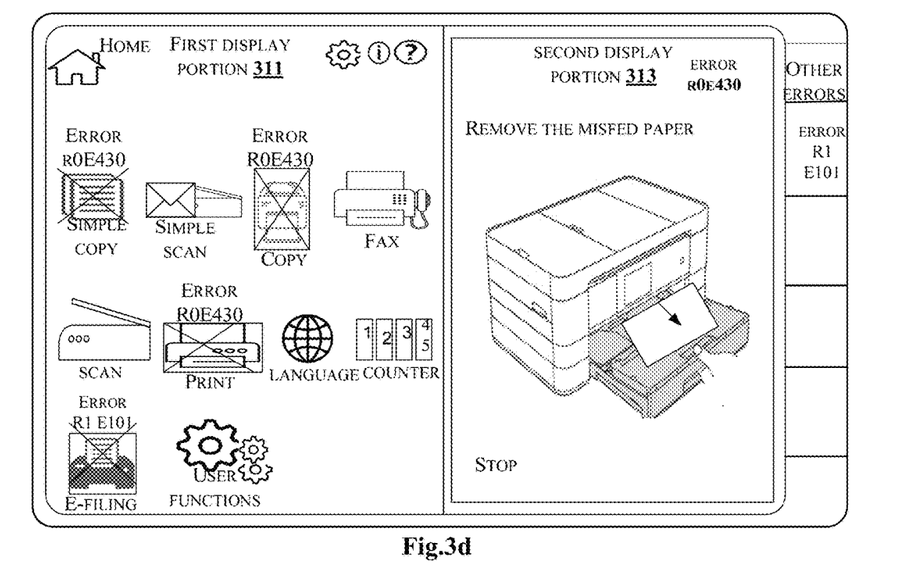
FIG. 3d shows an exemplary representation of a display screen with two display portions in accordance with some embodiments of the present disclosure.

The access interruption module 221 may perform at least one of interrupting access or disabling access to the user of the MFP 100 to the one or more functions which may be operably dependent on the one or more functional unit 103 of the MFP 100. The access interruption module 221 may interrupt the access by blocking the access to the one or more functions which are operably dependent on the one or more functional unit 103. FIG. 3b, FIG. 3c and FIG. 3d show exemplary representations of a display screen of the MFP with two display portions in accordance with some embodiments of the present disclosure. FIG. 3b, FIG. 3c and FIG. 3d show the display screen of the MFP 100 into two divided display portions. FIG. 3b displays a first display portion 303 and a second display portion 305 after an engine speed error occurs in the MFP 100. As shown in FIG. 3b, the first display portion 303 displays the one or' more function icons which may be operably independent of the engine speed and may be accessed by the user. Also, the first display portion 303 displays the one or more function icons, which are operably dependent on the engine of the MFP 100 and are interrupted by the access interruption module 221 along with associated error number. The one or more function icons displayed in the first display portion 303 include simple scan, copy and print icons, with a cross mark on top of each function icons for the user to know which functionalities are disabled due to the error. In at least one embodiment, the disability of the functions may also be displayed to users by grey-outing the icons, completely deleting the disabled function icons and the like. A person skilled in the art would understand that any other form of disabling the function icons, which are not mentioned explicitly, may also be used in the present disclosure. In at least one embodiment, the first display screen 303 may be a shrunk version of home screen of the MFP 100.

Further, the second display portion 305 displays the information regarding the error, which is an engine speed mismatch. Consider a scenario where a user may run a scan function as shown in FIG. 3c. In such case, access to functions which are operably independent of the scanner unit of the MFP 100 may be provided. Thus, the display screen in FIG. 3c, when the scan function takes place is divided into two display portions. A first display portion 307 displays the functions such as a simple scan and scan, which are operably dependent on the scanner unit and are disabled. In at least one embodiment, the simple scan and scan functions are disabled due to on-going scanning by the scanner unit. The simple scan and scan function icons are represented with across mark along with the status code "R0J834" of the scanner unit. The first display portion 307 also displays the function such as a simple copy, print, fax etc., which are operably independent of the scanner unit and may be accessible by the user. A second display portion 309 displays execution and on-going progress status of the scan function, due to which functions which are operably dependent on the scanner unit may be disabled. Similarly, FIG. 3d displays a display screen of the MFP 100 which is divided into two display portions after an error of misted paper during a printing function occurred. As shown in FIG. 3d, a first display portion 311 displays the functions such as a simple copy, copy, print and e-filing as the functions which are operably dependent on the printer unit and are disabled. The first display portion 311 also displays the functions such as scan, simple scan and fax, which are operably independent of the printer unit and may be accessible to the user. A second display portion 313 displays the error number "R0E430" and error information as" misfed paper error" and displays jam clearing guidance as "remove the misfed paper". In at least one embodiment, the error with highest default priority may be displayed in the second display portion 313. In FIG. 3d, the error R0E430 comprises the highest priority and is represented by "R0".

Further, the second display portion 313 displays on the right most section, other errors, such as an error R1E101. The other errors may be provided whenever multiple errors occur and multiple functions are disabled. For example, a user may wish to use an e-filing function which is associated with the error R1E101. In such a case, in at least one embodiment, the user may select and click on the error code R1E101 in the right most section as shown in FIG. 3d to obtain the guidance for resolving the error. The selection of the error code "R1E101 may provide guidance to clear the error. Once the user clicks and selects the R1E101 from the right most section, the second display portion 313 changes and displays the error number R1E101 and corresponding error information and guidance. Simultaneously, the error code R0E430 is added to the other errors list. In at least one embodiment, the guidance to resolve the error code R0E101 may also be provided to the user by clicking on the disabled e-filing function icon in the first display portion 311. In at least one embodiment, the guidance to resolve the error code R0E101 may be displayed on the second display portion 313, when the user clicks on either the e-filing function icon in the first display portion 311 or click and selects the error code R0E101 in the right most section. In at least one embodiment, if no action is taken by the user for a pre-defined time, the second display portion 313 may refresh and display the default highest priority error, which is R0E430 in FIG. 3d.

Figure 3E:
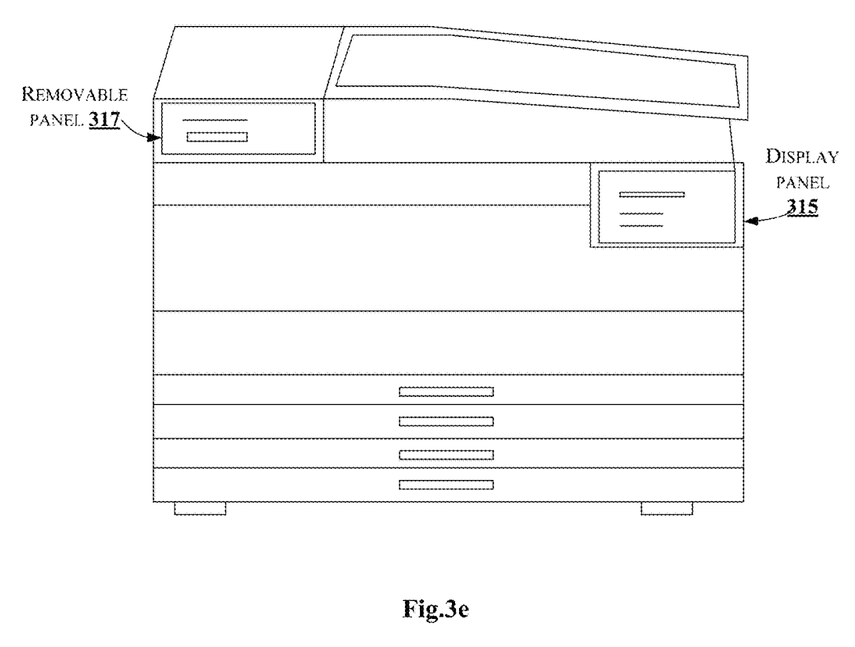
FIG. 3e shows an exemplary Multi-Functional Printer with dual display screen in accordance with some embodiments of the present disclosure.

In at least one embodiment, the MFP 100 may comprise two separate display screens as shown in FIG. 3e. FIG. 3e shows an exemplary Multi-Functional Printer with dual display screens in accordance with some embodiments of the present disclosure. As shown in FIG. 3e, the MFP 100 includes a display panel 315 to display all functions operably dependent and operably independent of the one or more functional unit 103 and a removable panel 317 which may display all information associated with error and non-functional messages.

The access enabling module 223 may enable access to the one or more functions which may be operably independent of the one or more functional unit 103. The access enabling module 223 may enable the one or more functions to be executed by the user.

Figure 4A:
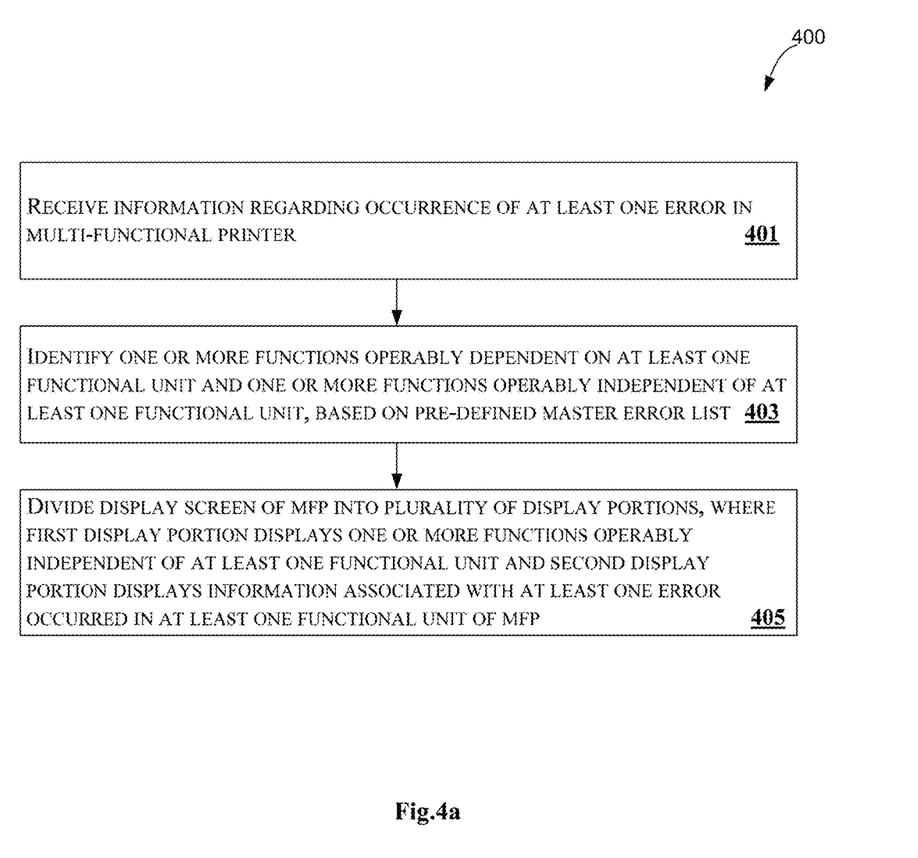
FIG. 4a illustrates a flowchart showing a method for managing access of functions in the MFP in accordance with some embodiments of present disclosure.

FIG. 4a illustrates a flowchart showing a method for managing access of functions in the MFP in accordance with some embodiments of present disclosure.

As illustrated in FIGS. 4a-d, the method 400 includes one or more blocks for managing access of functions in the MFP. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the information regarding occurrence of at least the one error in the one or more functional unit 103 of the MFP 100 is received, by the receiving module 215.

At block 403, the one or more functions operably dependent on the one or more functional unit 103 and one or more functions operably independent of the one or more functional unit 103 are identified, by the function identification module 217, based on the pre-defined master error list 207.

At block 405, the display screen of the MFP 100 is divided, by the display screen divider module 219 into the plurality of display portions. The first display portion of the plurality of display portions displays the one or more functions operably independent of one or more functional unit 103. The second display portion of the plurality of display portions displays information associated with the at least one error that has occurred in the one or more functional unit 103 of the MFP 100.

Figure 4B:
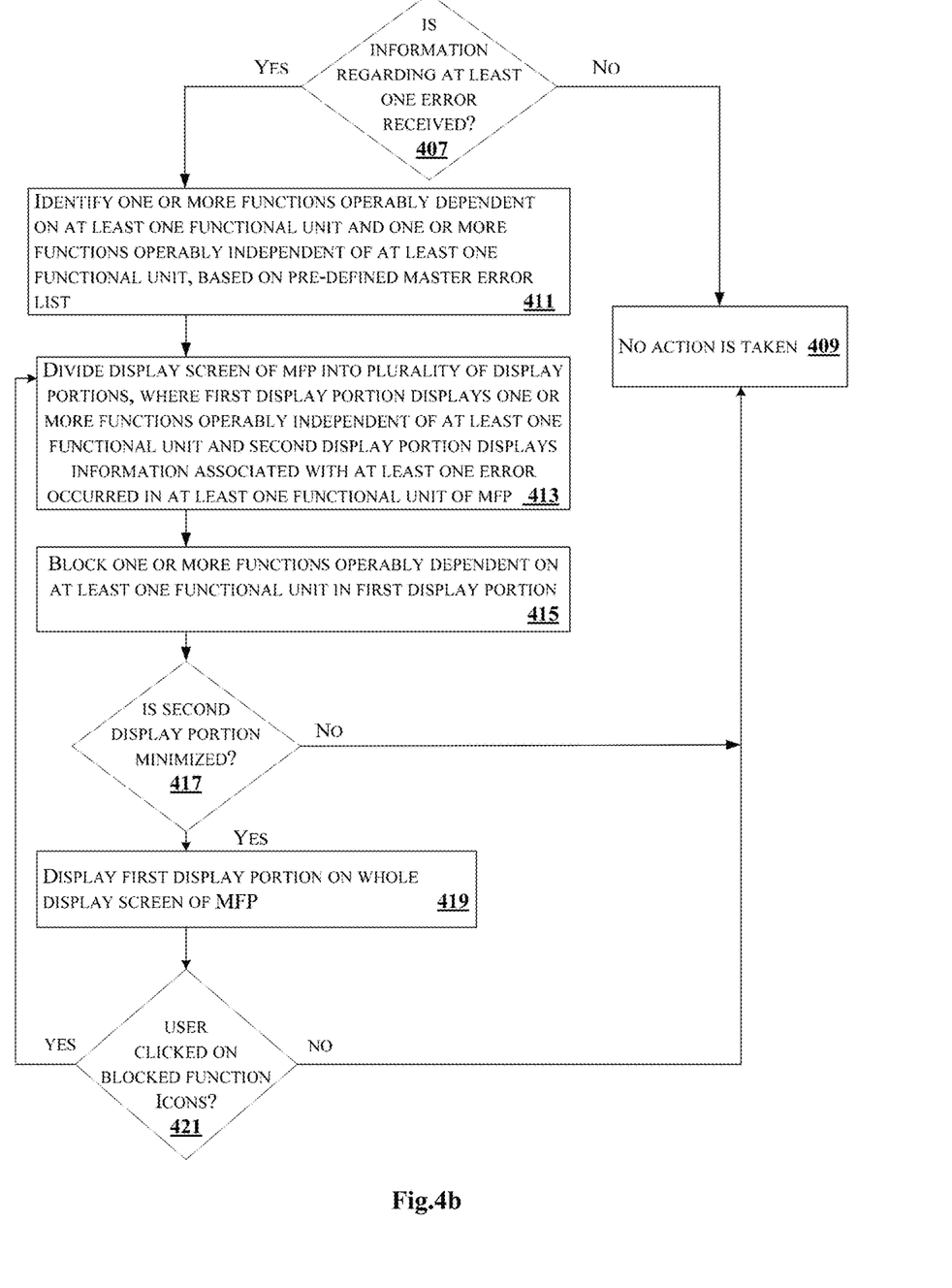
FIG. 4b illustrates a flowchart showing a method for dividing a display screen of a Multi-Functional Printer in accordance with some embodiments of the present disclosure.

FIG. 4b illustrates a flowchart showing a method for dividing a display screen of a Multi-Functional Printer in accordance with some embodiments of the present disclosure.

At block 407, the access manager 101 checks if the information regarding at least the one error in one or more functional unit 103 is received. If the information is received, the method moves to block 411. Alternatively, if the information is not received, the method moves to block 409.

At block 409, no action is taken by the access manager 101. In some embodiments, at block 409, the access manager 101 may be in a waiting or standby mode.

At block 411, the one or more functions which are operably dependent on the one or more functional unit 103 and the one or more functions which are operably independent of the one or more functional unit 103 are identified by the access manager 101, based on the pre-defined master error list.

At block 413, the display screen of the MFP 100 is divided into the plurality of display portions, where the first display portion of the plurality of display portions displays the one or more functions operably independent of one or more functional unit 103. The second display portion of the plurality of display portions displays information associated with the at least one error that has occurred in the one or more functional unit 103 of the MEP 100.

At block 415, the one or more functions which are operably dependent on the one or more functional unit 103 are blocked for access, by the access manager 101 in the first display portion.

At block 417, the access manager 101 checks if the second display portion is minimized. If the display portion is not minimized, the method moves to block 409. Alternatively, if the second display portion is minimized, the method moves to block 419.

At block 419, the first display portion is displayed, by the access manager 101, on whole display screen of the MFP 100.

At block 421, the access manager 101 checks if the user clicked on one or more blocked functions. If the one or more blocked functions are clicked, the method moves to block 413. Alternatively, if the one or more blocked functions are not clicked, the method moves to block 409.

Figure 4C:
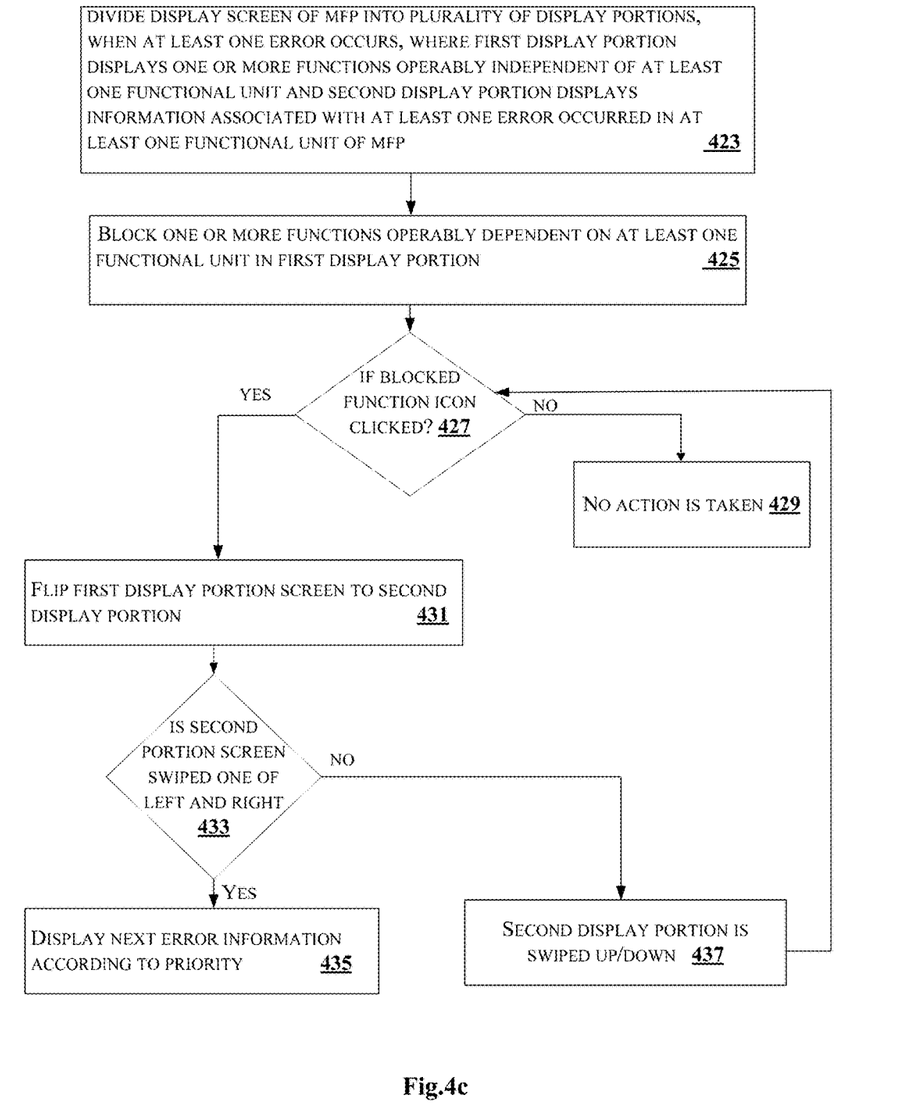
FIG. 4c illustrates a flowchart showing a method to flip a display of a Multi-Functional Printer in accordance with some embodiments of the present disclosure.

FIG. 4c illustrates a flowchart showing a method to flip display of a Multi-Functional Printer in accordance with some embodiments of the present disclosure.

At block 423, the display screen of the MFP 100 is divided into the plurality of display portions, where the first display portion of the plurality of display portions displays the one or more functions operably independent of one or more functional unit 103. The second display portion of the plurality of display portions displays information associated with the at least one error that has occurred in the one or more functional unit 103 of the MFP 100.

At block 425, the one or more functions which are operably dependent on the one or more functional unit 103 are blocked by the access manager 101 in the first display portion.

At block 427, the access manager 101 checks if the one or more blocked function icons are clicked by user. If the one or more blocked function icons are not clicked, the method moves to block 429. Alternatively, if the one or more blocked functions are clicked, the method moves to block 431.

At block 429, no action is taken by the access manager 101.

At block 431, the first display portion is changed, by the access manager 101 to the second display portion by flipping the first display portion.

At block 433, the access manager 101 checks if the second display portion is swiped to one of toward left direction and right direction. If the second display portion is swiped to one of toward left direction and right direction, the method moves to block 435. Alternatively, if the second display portion is not swiped toward one of the directions, the method moves to block 437.

At block 435, the error information associated with errors present in one of left direction and right direction is displayed by the access manager 101, based on the priority of the error.

At block 437, the access manager 101 identifies the second display portion to be swiped in one of upward direction and downward direction. The method moves back to block 427 once the second display portion is swiped in one of the upward direction and the downward direction.

Figure 4D:
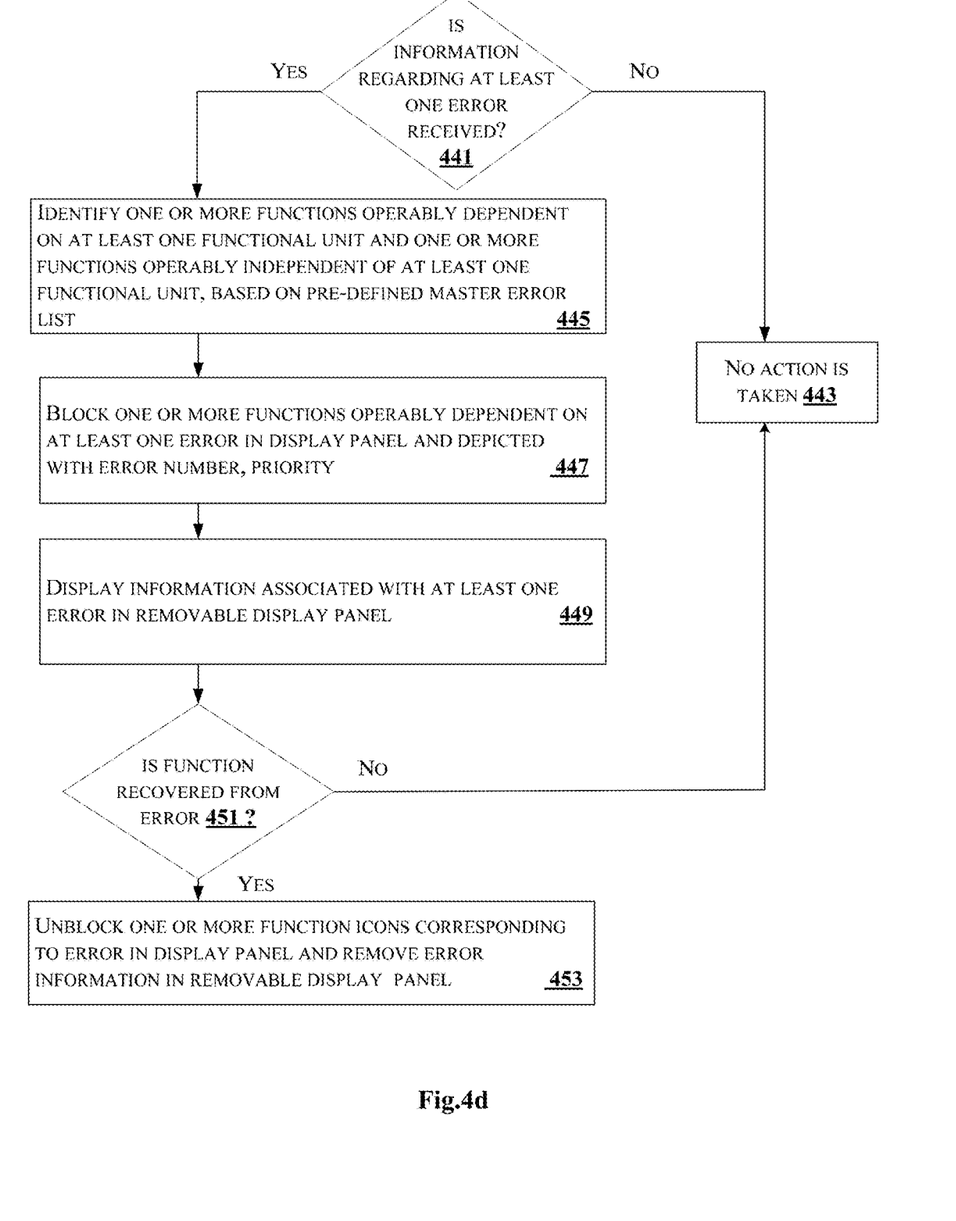
FIG. 4d illustrates a flowchart showing a method for displaying error information in a dual display screen of a Multi-Functional Printer in accordance with some embodiments of the present disclosure.

FIG. 4d illustrates a flowchart showing a method for displaying error information in dual display screen of a Multi-Functional Printer in accordance with some embodiments of the present disclosure.

At block 441, the access manager 101 checks if the information regarding at least the one error in one or more functional unit 103 is received. If the information is received, the method moves to block 445. Alternatively, if the information is not received, the method moves to block 443.

At block 443, no action is taken by the access manager 101.

At block 445, the one or more functions which are operably dependent on the one or more functional unit 103 and the one or more functions which are operably independent of the one or more functional unit 103 are identified by the access manager 101, based on the pre-defined master error list.

At block 447, the one or more functions which are operably dependent on the one or more functional unit 103 are blocked for access, by the access manager 101 in the display panel 315 and depicted with error number and priority.

At block 449, the information associated with at least the one error in at least the one functional unit 103 is displayed on the removable panel 317.

At block 451, the access manager 101 checks if the one or more functions are recovered from the error. If the functions are recovered the method moves to block 453. Alternatively, if the functions are not recovered, the method moves to block 443.

At block 453, the one or more function icons corresponding to at least the one error are unblocked and the corresponding error number is removed by the access manager 101, from the display panel 315. Also, the error information corresponding to the at least one error is removed from the removable panel 317.

In embodiment one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random. Access Memory (RAM), Read-Only Memory (ROM), volatile memory, non-volatile memory, hard drives, CD ROMs, DVDs, flash drives, disks, and any other physical storage media.

At least one embodiment of the present disclosure may facilitate access of functions in multifunctional printer to users even during an error.

At least one embodiment of the present disclosure provides a time efficient MFP, as users may not be required to wait until recovery from an error to perform other functions.

At least one embodiment of the present disclosure facilitates users to identify services which are associated with errors.

At least one embodiment of the present disclosure facilitates users to see a priority of each error in the MFP.

At least one embodiment of the present disclosure facilitates users to access and/or share data, with other MFPs and systems in groups, through a panel.

At least one embodiment of the present disclosure facilitates a user/serviceperson to install/upgrade software without booting in special recovery modes.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor may be at least one of a microprocessor or a processor capable of processing and executing the queries. A non-transitory computer readable medium may include media such as a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for transitory media. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic: Of course, those skilled in the art will recognize that many modifications may be made to this configuration without departing from the scope of the invention, and that the article of manufacture may include various suitable information bearing media.

The terms "at least one embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of at least one embodiment with several components in communication with each other does not imply that all such components are required. On the contrary, a variety of optional components are described to illustrate the wide variety of possible embodiments.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

The illustrated operations of FIGS. 4a-4d show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for managing access of functions in a Multi-Functional Printer (MFP), the method comprising:
   receiving, by an access manager of an MFP, information regarding occurrence of at least one error, in at least one MFP component of the MFP;
   identifying, by the access manager, one or more functions operably dependent on the at least one MFP component and one or more functions operably independent of the at least one MFP component based on a pre-defined master error list; and
   dividing, by the access manager, a display screen of the MFP into a plurality of display portions, wherein a first display portion of the plurality of display portions displays the one or more functions operable independently of the at least one MFP component, and wherein a second display portion of the plurality of display portions displays information associated with the at least one error that has occurred in the at least one MFP component of the MFP.

2. The method as claimed in claim 1, wherein the at least one error comprises at least one of a print error, a scan error, a speech mismatch error, a copy error, an electronic filing error or a fax error.

3. The method as claimed in claim 2, wherein the at least one error associated with the received information is updated in a current error list along with an associated error number, priority and one or more functions.

4. The method as claimed in claim 1, wherein the master error list comprises all errors associated with the MFP along with an associated error number, a priority and one or more functions.

5. The method as claimed in claim 1, further comprising at least one of interrupting access or disabling access for a user of the MFP to the one or more functions which are operably dependent on the at least one MFP component.

6. The method as claimed in claim 1, further comprising enabling access for a user of the MFP to the one or more functions operably independent of the at least one MFP component.

7. The method as claimed in claim 1, further comprising displaying the one or more functions operably dependent on the at least one MFP component along with an error number in the first display portion.

8. The method as claimed in claim I, further comprising performing, upon recovery from at least one error:
   removing at least one error from the current error list; and
   enabling access to the one or more functions associated with the at least one removed error.

9. An access manager for managing access of functions in a Multi-Functional Printer (MFP), comprising:
   a processor; and
   a memory communicatively coupled to the processor, wherein the memory stores processor instructions, which, on execution, cause the processor to:
   receive information regarding occurrence of at least one error in the MFP;
   identify one or more functions, operably dependent on at least one MFP component and one or more functions operably independent of the at least one MFP component, based on a pre-defined master error list;
   divide a display screen of the MFP into a plurality of display portions,
   wherein a first display portion of the plurality of display portions is configured to display the one or more functions operably independent of the at least one MFP component,
   wherein a second display portion of the plurality of display portions is configured to display information associated with the at least one error that has occurred in the at least one MFP component.

10. The access manager as claimed in claim 9, wherein the at least one error comprises at least one of a print error, a scan error, a speech mismatch error, a copy error, an electronic filing error or a fax error.

11. The access manager as claimed in claim 9, wherein the master error list comprises all errors associated with the MFP along with an associated error number, priority and one or more functions.

12. The access manager as claimed in claim 9, wherein the processor is configured to update at least one error associated with the received information in a current error list along with associated error number, priority and one or more functions.

13. The access manager as claimed in claim 9, wherein the processor is configured to perform operations comprising at least one of interrupting access or disabling access for a user of the MFP to the one or more functions, operably dependent on the at least one MFP component.

14. The access manager as claimed in claim 9, wherein the processor is configured to perform operations enabling access for a user of the MFP to the one or more functions, operably independent of the at least one MFP component.

15. The access manager as claimed in claim 9, wherein the processor is configured to perform, upon recovery from at least one error:
   removing at least one error from the current error list; and
   enabling access to the one or more functions associated with the at least one removed error.

16. The access manager as claimed in claim 9, wherein the processor is configured to permit access to the one or more functions that are operably independent from the at least one MFP component prior to recovery from the at least one error.

* * * * *